United States Patent
Hamza et al.

(10) Patent No.: US 9,547,910 B2
(45) Date of Patent: Jan. 17, 2017

(54) METHOD AND APPARATUS FOR VISION AIDED NAVIGATION USING IMAGE REGISTRATION

(75) Inventors: Rida Hamza, Maple Grove, MN (US); Sara Susca, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1893 days.

(21) Appl. No.: 12/717,163

(22) Filed: Mar. 4, 2010

(65) Prior Publication Data

US 2011/0218733 A1   Sep. 8, 2011

(51) Int. Cl.
| | |
|---|---|
| *G01C 21/10* | (2006.01) |
| *G06T 7/20* | (2006.01) |
| *G08G 1/0968* | (2006.01) |
| *G01C 21/34* | (2006.01) |
| *G01C 21/28* | (2006.01) |
| *G01C 21/16* | (2006.01) |

(52) U.S. Cl.
CPC ............. *G06T 7/20* (2013.01); *G01C 21/165* (2013.01); *G01C 21/28* (2013.01); *G01C 21/3415* (2013.01); *G08G 1/096827* (2013.01); *G06T 2207/10032* (2013.01); *G06T 2207/30181* (2013.01); *G06T 2207/30244* (2013.01)

(58) Field of Classification Search
CPC ... G01C 21/165; G01C 21/3415; G01C 21/28; G06T 7/20; G08G 11/096827
USPC .......................................... 701/411, 412, 469
See application file for complete search history.

(56) References Cited

U.S. PATENT DOCUMENTS

| | | |
|---|---|---|
| 4,695,959 A | 9/1987 | Lees et al. |
| 5,128,874 A | 7/1992 | Bhanu et al. |
| 5,331,562 A | 7/1994 | McGuffin |
| 5,627,905 A | 5/1997 | Sebok et al. |

(Continued)

FOREIGN PATENT DOCUMENTS

GB    2362213    11/2001

OTHER PUBLICATIONS

Friston, Karl, "Experimental Design and Statistical Parametric Mapping", "Human Brain Function", 2003, vol. 2, Publisher: Academic Press.

(Continued)

*Primary Examiner* — Ramsey Refai
(74) *Attorney, Agent, or Firm* — Fogg & Powers LLC

(57) ABSTRACT

A navigation system comprises an image sensor operable to obtain a first image at a first moment in time and a second image at a second moment in time; an inertial measurement unit (IMU) operable to obtain measurement data corresponding to the first and second moments in time; and a processing unit coupled to the image sensor and the IMU. The processing unit is operable to estimate motion between the first and second moments in time based on the measurement data from the IMU; calculate a plurality of transformations based on the estimated motion; apply each of the plurality of transformations to the first image to produce a plurality of predicted images; compare the second image to each of the plurality of predicted images; select the predicted image from the plurality of predicted images which most closely matches the second image; and compensate for error in the IMU measurement data based on the transformation corresponding to the selected predicted image.

20 Claims, 3 Drawing Sheets

(56) References Cited

U.S. PATENT DOCUMENTS

| | | | |
|---|---|---|---|
| 6,628,715 B1* | 9/2003 | Iu et al. | 375/240.16 |
| 6,912,464 B1 | 6/2005 | Parker | |
| 7,489,806 B2* | 2/2009 | Mohri et al. | 382/107 |
| 2008/0195316 A1* | 8/2008 | Krishnaswamy | 701/213 |
| 2009/0248225 A1* | 10/2009 | Stecko et al. | 701/3 |
| 2009/0326816 A1* | 12/2009 | Park et al. | 701/213 |
| 2011/0013016 A1* | 1/2011 | Tillotson | 348/135 |

OTHER PUBLICATIONS

Zitova et al, "Image Registration Methods: A Survey", "Image and Vision Computing", 2003, pp. 977-1000, vol. 21, Publisher: Elsevier.

Papademetris et al., "Image Registration: A Review", "http://noodle.med.yale.edu/~papadr", Oct. 16, 2003, Publisher: Yale MRRC fMRI Seminar Series.

European Patent Office, "European Search Report", Sep. 13, 2012, pp. 1-6, Published in: EP.

Conte et al, "An Integrated UAV Navigation System Based on Aerial Image Matching", Mar. 1, 2008, pp. 1-10.

Mourikis et al., "Vision-Aided inertial navigation for Spacecraft Entry, Descent, and Landing", "IEEE Transactions of Robotics", Apr. 2009, pp. 264-280, vol. 25, No. 2.

Schlaile et al., "Using Natural Features for Vision Based Navigation of an Indoor-VTOL MAV", "Aerospace Science and Technology", Oct. 1, 2009, pp. 349-357, No. 13.

European Patent Office, "Office Action", "from Foreign Counterpart of U.S. Appl. No. 12/717,163", Jun. 17, 2013, pp. 1-5, Published in: EP.

\* cited by examiner

METHOD AND APPARATUS FOR VISION AIDED NAVIGATION USING IMAGE REGISTRATION

BACKGROUND

Navigation systems often include an inertial measurement unit (IMU). Typical IMUs include a plurality of gyroscopes and a plurality of accelerometers. The gyroscopes and accelerometers measure a vehicle's velocity, orientation and gravitational forces. However, typical IMUs suffer from various sources of error in the measurements. For example, source of error can include gyroscope scale factor error, bias, and drift. These errors may be time-varying and can accumulate in the IMU measurements. In particular, a small error in an initial measurement may be propagated in subsequent measurements and combined with additional error or magnified by the navigation calculations. For example, a small error in attitude, such as a 10th of a degree, can push the vehicle hundreds of meters away from its target destination.

SUMMARY

In one embodiment, a navigation system is provided. The navigation system comprises an image sensor operable to obtain a first image at a first moment in time and a second image at a second moment in time; an inertial measurement unit (IMU) operable to obtain measurement data corresponding to the first and second moments in time; and a processing unit coupled to the image sensor and the IMU. The processing unit is operable to estimate motion between the first and second moments in time based on the measurement data from the IMU; calculate a plurality of transformations based on the estimated motion; apply each of the plurality of transformations to the first image to produce a plurality of predicted images; compare the second image to each of the plurality of predicted images; select the predicted image from the plurality of predicted images which most closely matches the second image; and compensate for error in the IMU measurement data based on the transformation corresponding to the selected predicted image.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
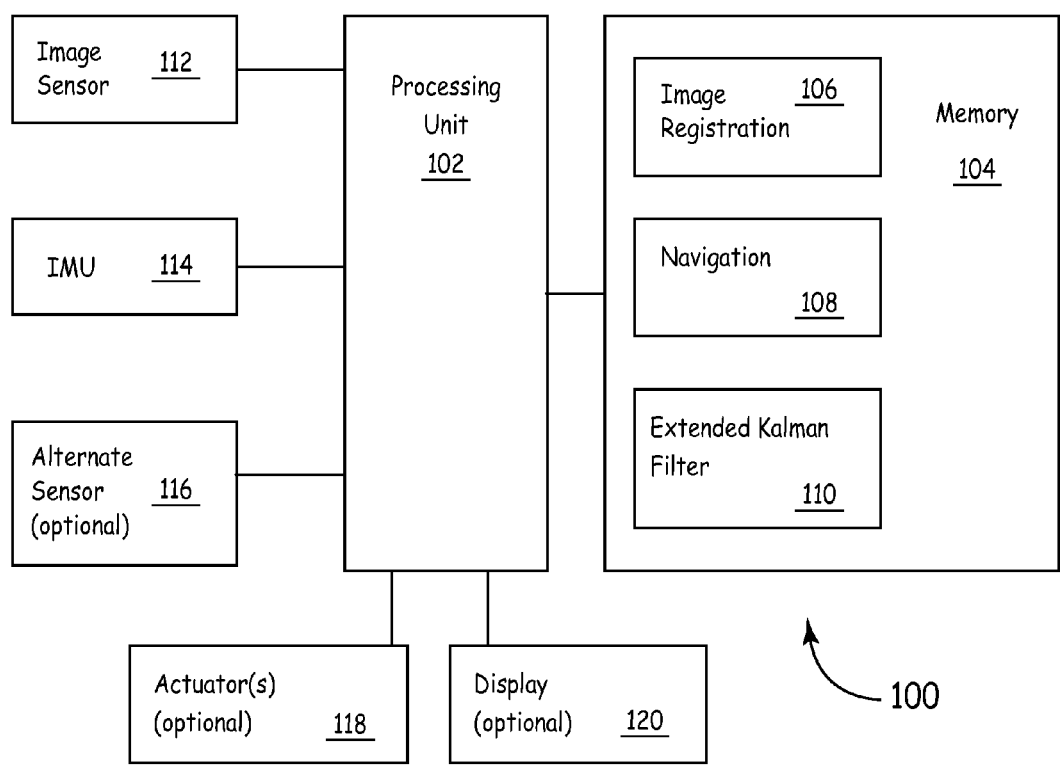
FIG. 1 is block diagram of one embodiment of a navigation system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of a navigation system 100. Navigation system 100 includes an image sensor 112 and an inertial measurement unit (IMU) 114 coupled to a processing unit 102. The IMU 114 provides vehicle state data to the processing unit 102. Vehicle state data includes data regarding the position, orientation, velocity, etc. of the vehicle in which system 100 is located. For example, in some implementations, the IMU 114 is comprised of a plurality of accelerometers and gyroscopes which provide measurements of linear acceleration and angular rate. The processing unit 102 uses the data from the IMU to determine position and velocity of the vehicle in which the system 100 is located. It is to be understood that, although only a single processing unit 102 is shown in FIG. 1, that the processing unit 102 may include multiple processors with each processor responsible for carrying out a particular task.

The image sensor 112 is a monocular camera in this embodiment. The particular wavelength, frequency band, etc. vary according to specific implementations. Furthermore, the image sensor 112 can be implemented using any appropriate imaging technology such as, but not limited to, two-dimensional image sensing, Light Detection and Ranging (LiDAR) sensors, millimeter wave Radio Detection and Ranging (RADAR) sensors, etc.

The processing unit 102 receives the vehicle state data from the IMU 114 and the image data from the image sensor 112. The processing unit 102 then uses image registration techniques to refine the estimates of the error in the IMU data based on the image data. The processing unit 102 includes or functions with software programs, firmware or other computer readable instructions for carrying out various methods, process tasks, calculations, and control functions, used in the image registration techniques to refine the estimates of IMU error.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

For example, in the embodiment shown in FIG. 1, image registration instructions 106, navigation instructions 108, and extended Kalman filter instructions 110 are stored on memory 104. The image registration instructions 106 are implemented by the processing unit 102 to calculate the error in the IMU data based on the received image data. The navigation instructions 108 are implemented by the processing unit 102 to calculate position, velocity, etc. In some embodiments, the processing unit 102 outputs control commands based on the navigation calculations to one or more actuators 118 to control the movement of the vehicle. In other embodiments, the processing unit 102 outputs the results of the navigation calculations to a display unit 120 for display to a vehicle operator. The extended Kalman filter 110 is implemented by the processing unit 102 to compensate for errors in the IMU data based on the results of the error calculated from the image registration techniques. In addition, in some embodiments, an alternate sensor is included, such as a global positioning system (GPS) sensor. In such embodiments, data from the alternate sensor is used to compensate for errors in the IMU data via the extended Kalman filter 110.

In operation, the image sensor 112 obtains a first image at a time T. The image sensor 112 provides the first image to the processing unit 102. In addition, the IMU 114 obtains measurement data corresponding to time T and provides the data to the processing unit 102. The processing unit 102 calculates the vehicle's position, heading, attitude, velocity, etc. at time T based on the IMU measurement data. At time T+dT, the image sensor 112 obtains a second image and provides the second image to the processing unit 102. In addition, the IMU 114 provides measurement data for time T+dT to the processing unit 102. By analyzing the measurement data from time T and time T+dT, the processing unit 102 estimates the vehicle's movement (e.g. rotation and translation) between time T and time T+dT. The estimated movement of the vehicle based on the IMU measurement data may be incorrect due to errors from sources such as drift, bias, gyro scale factor, etc.

The estimated motion of the vehicle's movement from the IMU measurement data is used as a guide by the processing unit 102 to determine a range of possible values for the movement of the vehicle. The processing unit 102 then uses intensity-based image registration to produce a plurality of transformations (also referred to herein as registration maps) within the range of possible values defined by the IMU measurements. Intensity-based image registration is a technique known to one of skill in the art for determining a transformation which maps a first image to align with a second image. Intensity-based image registration compares the intensity of the raw pixel data of the first and second images rather than matching features (e.g. points, lines, or edges) in the first and second images. Each of the plurality of transformations is modeled as locally (non-linear) affine and smooth across the corresponding field of view. Each transformation is flexible enough to tolerate local and global contrast and brightness changes.

The processing unit 102 produces a plurality of predicted images corresponding to the plurality of non-linear transformations. For example, if it is estimated that the vehicle moved sideways then a transformation slides the image to one side accordingly. Similarly, if is it estimated that the vehicle moved forward, a transformation crops edges that would no longer be visible in the image. Each of the predicted images is compared to a second image captured at time T+dT to identify the predicted image which most closely matches the second image. In particular, in this embodiment, the processing unit 102 determines the quadratic error between each predicted image and the second image. The predicted image with the smallest quadratic error is selected as the closest match.

The parameters of the transformation corresponding to the selected predicted image are then used in the Extended Kalman Filter 110 to provide corrections to the IMU measurement data. The processing unit 102 repeats this process for each time interval to continuously compensate for error in the IMU measurement data. The processing unit 102 then uses the compensated IMU data for navigation calculations. The results of the navigation calculations are then displayed on display unit 120, in some embodiments, and/or used to output control commands to one or more actuators 118, in other embodiments.

By using intensity-based image registration, system 100 avoids many of the difficulties associated with typical feature-based image matching. Feature-based image matching typically involves extracting features, such as points and shapes, from an image. The extracted features are then matched with corresponding features in a second image to determine the change between the two images. However, typical feature-based image matching can be cumbersome due to the changes from frame to frame and the environmental conditions. In addition, typical feature-based image matching is processor intensive which makes it difficult to keep up with the real-time navigation calculations. These difficulties are substantially avoided by the system 100 described above since intensity-based image registration does not attempt to extract features and operates on the raw pixel data directly.

In addition, by producing a plurality of predicted images, system 100 is able to compensate substantially for the error in IMU data. Furthermore, the use of image data to compensate for errors in IMU data, as described above, enables the use of less expensive IMUs which have poor long-run performance as compared to more expensive IMUs. In particular, the lower cost IMUs benefit from the good long term performance of the image sensor 112

Figure 2:
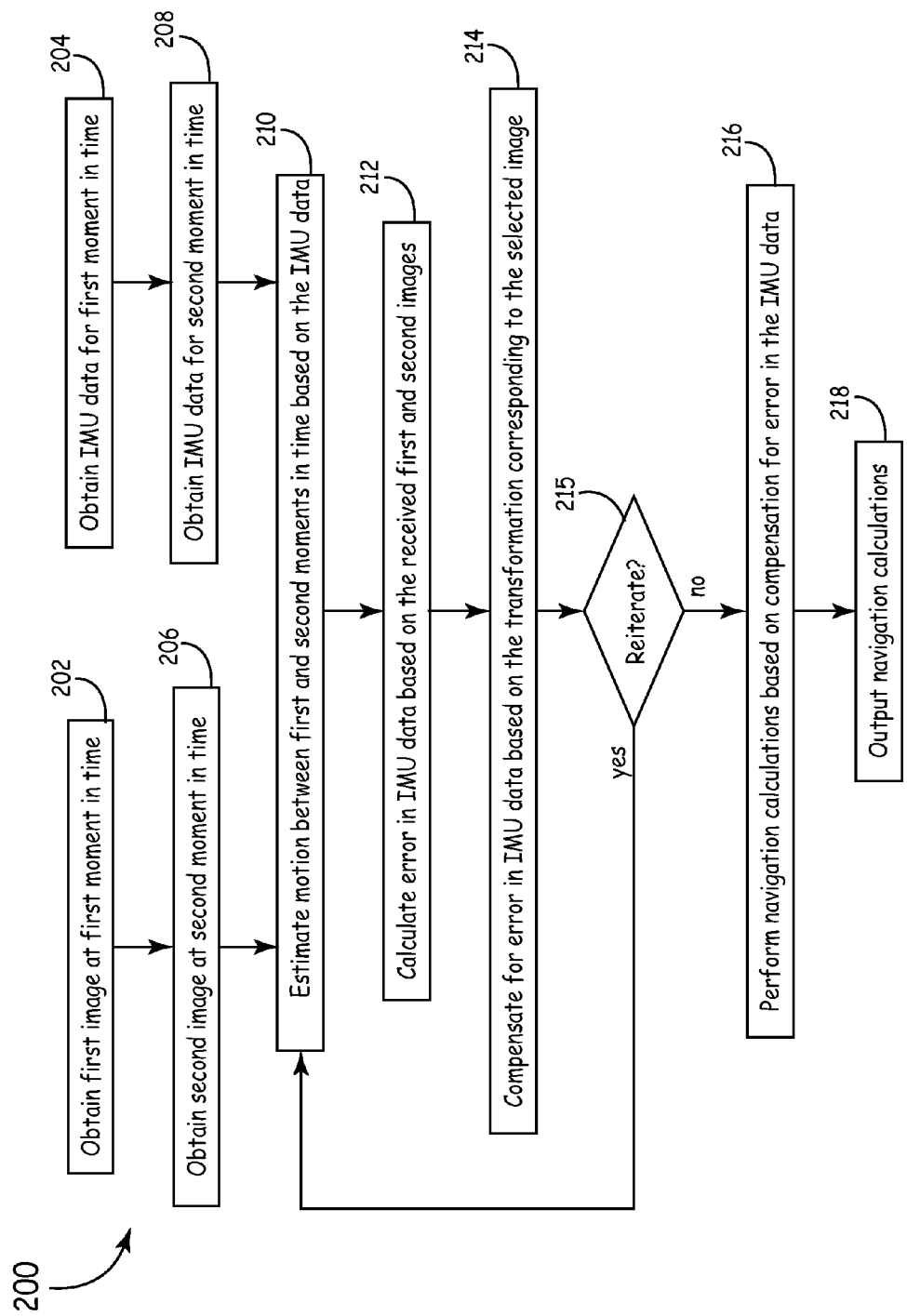
FIG. 2 is a flow chart depicting one embodiment of a method of navigation.

FIG. 2 is a flow chart depicting one embodiment of a method 200 of navigation. Method 200 can be implemented by the system 100 described above. At block 202, a first image is obtained at a first moment in time. At block 204, IMU measurement data corresponding to the first moment in time is obtained. At block 206, a second image is obtained at a second moment in time. At block 208, IMU measurement data corresponding to the second moment in time is obtained.

At block 210, motion between the first and second moment in time is estimated based on the IMU measurement data. At block 212, error in the IMU data is determined based on the first and second images received using image registration. Additional details regarding the determination of error is discussed in more detail below with respect to FIG. 3.

At block 214, errors in the IMU data are compensated for based on the parameters of the transformation corresponding to the selected predicted image. In particular, as described above, in some embodiments an extended Kalman filter is used to compensate for the errors in the IMU data. Extended Kalman filters are known to one of skill in the art and not discussed in more detail herein. At block 215, it is determined if the calculation of error and compensation for the error in the IMU data should be reiterated. For example, the selected predicted image may not match exactly the second image. In such cases, it may be desirable to further refine the estimate of error in the IMU data.

If the calculations are to be reiterated, the method 200 returns to block 210 where the motion estimate is refined based on the IMU measurement data compensated for error. The error in the IMU data is then recalculated based on the refined motion estimate at block 212. The IMU data is then further compensated for error, at block 214, using the recalculated error.

At block 216, navigation calculations are performed using the IMU data compensated for error. At block 218, the navigation calculations are output. For example, in some embodiments, the navigation calculations include control commands for controlling one or more actuators, such as, but not limited to engine thrust, brakes, etc. In other embodiments, the navigation calculations are output to a display unit to provide the data, such as velocity, attitude, position, etc., to an operator of the vehicle.

Figure 3:
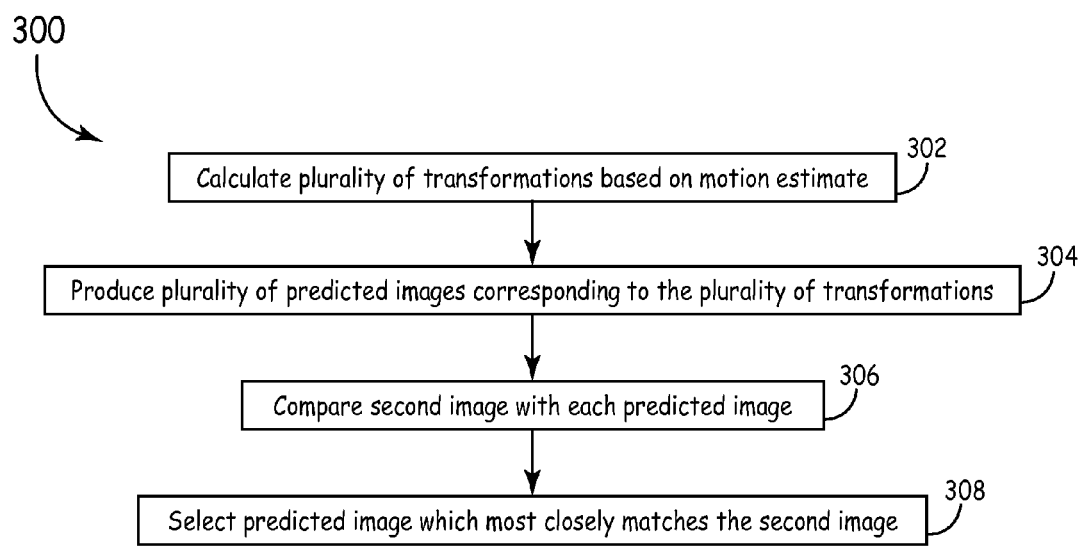
FIG. 3 is a flow chart depicting one embodiment of a method of determining error in vehicle state data.

FIG. 3 is a flow chart depicting one embodiment of a method of determining error in vehicle state data. Method 300 can be implemented at block 212 in method 200 above. At block 302, intensity-based image registration is used to calculate a plurality of transformations based on the estimated motion from IMU data. At block 304, a plurality of predicted images corresponding to the plurality of transformations is produced. In particular, each transformation maps the first image to one of the plurality of predicted images. The predicted images each represent a prediction of the second image based on the estimated motion.

At block 306, the second image obtained at the second moment in time is compared to each of the predicted images. For example, in this embodiment, a quadratic error between the second image and each of the predicted images is calculated. At block 308, the predicted image which most closely matches the second image is selected. For example, in this embodiment, the predicted image corresponding to the smallest quadratic error is selected as the predicted image which most closely matches the second image. Although the selected predicted image may not match exactly the second image, the selected predicted image provides correction to the IMU data to substantially compensate for error. In addition, for further correction, the process of generating transformation and predicted images can be reiterated. For example, in a subsequent iteration, the estimated motion is refined based on the compensation for error in the IMU data. The plurality of transformations is then calculated based on the refined IMU motion estimate. Thus, each subsequent iteration provides predicted images which more closely match the second image. Further compensation for errors in the IMU data is then performed with the subsequent selected transformation.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A navigation system comprising:
an image sensor operable to obtain a first image at a first moment in time and a second image at a second moment in time;
an inertial measurement unit (IMU) operable to obtain measurement data corresponding to the first and second moments in time; and
a processing unit coupled to the image sensor and the IMU, the processing unit operable to:
estimate motion between the first and second moments in time based on the measurement data from the IMU; and
determine error in the IMU measurement data based on the first and second images, wherein the processing unit is configured to determine error in the IMU measurement data by:
calculating a plurality of transformations based on the estimated motion;
applying each of the plurality of transformations to the first image to produce a plurality of predicted images;
comparing the second image to each of the plurality of predicted images;
selecting the predicted image from the plurality of predicted images which most closely matches the second image;
wherein the processing unit is further configured to:
and compensate for error in the IMU measurement data based on the transformation corresponding to the selected predicted image;
perform navigation calculations based on the compensated IMU measurement data; and
output the navigation calculations.

2. The navigation system of claim 1, further comprising:
an alternate sensor coupled to the processing unit, the alternate sensor operable to provide measurement data to the processing unit;
wherein the processing unit is further operable to compensate for error in the IMU measurement data based on the measurement data from the alternate sensor.

3. The navigation system of claim 2, wherein the alternate sensor is a global positioning satellite (GPS) sensor.

4. The navigation system of claim 1, wherein the processing unit is operable to compensate for error in the IMU measurement data with an extended Kalman filter.

5. The navigation system of claim 1, wherein the processing unit is operable to compare the second image with each of the plurality of predicted images by calculating a quadratic error between the second image and each of the plurality of predicted images, wherein the predicted image corresponding to the smallest quadratic error is the predicted image which most closely matches the second image.

6. The navigation system of claim 1, further comprising:
one or more actuators to control vehicle motion;
wherein the processing unit is operable to perform navigation calculations based on the IMU measurement data compensated for error and to output control signals to the one or more actuators based on the navigation calculations.

7. The navigation system of claim 1, further comprising:
a display unit to display the IMU measurement data compensated for error;
wherein the processing unit is operable to output the IMU measurement data compensated for error to the display unit.

8. The navigation system of claim 1, wherein the processing unit is operable to:
refine the motion estimate between the first and second moments in time based on the IMU measurement data compensated for error;
calculate a second plurality of transformations based on the refined motion estimate;
apply each of the second plurality of transformations to the first image to produce a second plurality of predicted images;
compare the second image to each of the second plurality of predicted images;
select the predicted image from the second plurality of predicted images which most closely matches the second image; and
further compensate for error in the IMU measurement data based on the transformation corresponding to the selected predicted image from the second plurality of predicted images.

9. A method of navigation, the method comprising:
obtaining a first image with an image sensor at a first moment in time;
obtaining a second image with an image sensor at a second moment in time;
obtaining inertial measurement unit (IMU) measurement data with an IMU, the IMU measurement data corresponding to the first and second moments in time;
estimating motion between the first and second moments in time, in a processing unit, based on the IMU measurement data;
determining error in the IMU measurement data based on the first and second images, wherein determining error in the IMU measurement data comprises;
calculating a plurality of transformations, in the processing unit, based on the estimated motion;
producing a plurality of predicted images, in the processing unit, by applying each of the plurality of transformations to the first image;
comparing the second image to each of the plurality of predicted images, in the processing unit; and
selecting, in the processing unit, the predicted image from the plurality of predicted images which most closely matches the second image;
wherein the method further comprises:
compensating for error in the IMU measurement data, in the processing unit, based on the transformation corresponding to the selected predicted image;
performing navigation calculations, in the processing unit, based on the compensated IMU measurement data; and
outputting the navigation calculations.

10. The method of claim 9, wherein compensating for error in the IMU measurement data comprises combining the IMU measurement data and parameters of the transformation corresponding to the selected predicted image in an extended Kalman filter.

11. The method of claim 9, wherein comparing the second image to each of the plurality of predicted images comprises calculating a quadratic error between the second image and each of the plurality of predicted images, wherein the predicted image corresponding to the smallest quadratic error is the predicted image which most closely matches the second image.

12. The method of claim 9, further comprising:
performing navigation calculations based on the IMU measurement data compensated for error; and
outputting control signals based on the navigation calculations to one or more actuators.

13. The method of claim 9, further comprising outputting the IMU measurement data compensated for error to a display unit.

14. The method of claim 9, further comprising:
refining the motion estimate between the first and second moments in time based on the IMU measurement data compensated for error;
calculating a second plurality of transformations based on the refined motion estimate;
applying each of the second plurality of transformations to the first image to produce a second plurality of predicted images;
comparing the second image to each of the second plurality of predicted images;
selecting the predicted image from the second plurality of predicted images which most closely matches the second image; and
further compensating for error in the IMU measurement data based on the transformation corresponding to the selected predicted image from the second plurality of predicted images.

15. A program product comprising program instructions embodied on a non-transitory processor-readable medium for execution by a programmable processor, wherein the program instructions are operable to cause the programmable processor to:
estimate motion between a first moment in time and a second moment in time based on inertial measurement unit (IMU) measurement data corresponding to the first and second moments in time, the IMU measurement data obtained from an inertial measurement unit:
determine error in the IMU measurement data by:
calculating a plurality of transformations based on the estimated motion;
applying each of the plurality of transformations to a first image corresponding to the first moment in time to produce a plurality of predicted images, the first image obtained from the image sensor;
comparing a second image corresponding to the second moment in time to each of the plurality of predicted images, the second image obtained from the image sensor; and
selecting the predicted image from the plurality of predicted images which most closely matches the second image;
wherein the program instruction are further operable to cause the programmable processor to:
compensate for error in the IMU measurement data based on the transformation corresponding to the selected predicted image;
perform navigation calculations based on the compensated IMU measurement data; and
output the navigation calculations.

16. The program product of claim 15, wherein the program instructions are further operable to cause the programmable processor to compensate for error in the IMU measurement data by combining the IMU measurement data and parameters of the transformation corresponding to the selected predicted image in an extended Kalman filter.

17. The program product of claim 15, wherein the program instructions are further operable to cause the programmable processor to compare the second image to each of the plurality of predicted images by calculating a quadratic error between the second image and each of the plurality of predicted images, wherein the predicted image corresponding to the smallest quadratic error is the predicted image which most closely matches the second image.

18. The program product of claim 15, wherein the program instructions are further operable to cause the programmable processor to:
perform navigation calculations based on the compensation for error in the IMU measurement data; and
output control signals based on the navigation calculations to one or more actuators.

19. The program product of claim 15, wherein the program instructions are further operable to cause the programmable processor to output the IMU measurement data compensated for error to a display unit.

20. The program product of claim 15, wherein the program instructions are further operable to cause the programmable processor to:
refine the motion estimate between the first and second moments in time based on the compensation for error in the IMU measurement data;

calculate a second plurality of transformations based on the refined motion estimate;
apply each of the second plurality of transformations to the first image to produce a second plurality of predicted images;
compare the second image to each of the second plurality of predicted images;
select the predicted image from the second plurality of predicted images which most closely matches the second image; and
further compensate for error in the IMU measurement data based on the transformation corresponding to the selected predicted image from the second plurality of predicted images.

* * * * *